(12) United States Patent
Jones et al.

(10) Patent No.: US 7,225,991 B2
(45) Date of Patent: Jun. 5, 2007

(54) THREE DIMENSIONAL DATA STORAGE

(75) Inventors: Robert L. Jones, Andover, MA (US);
Leo M. Kenen, Bedford, MA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 10/825,852

(22) Filed: Apr. 16, 2004

(65) Prior Publication Data

US 2005/0040240 A1 Feb. 24, 2005

Related U.S. Application Data

(60) Provisional application No. 60/488,536, filed on Jul. 17, 2003, provisional application No. 60/463,660, filed on Apr. 16, 2003, provisional application No. 60/463,659, filed on Apr. 16, 2003.

(51) Int. Cl.
*G06K 19/00* (2006.01)

(52) U.S. Cl. ........................ 235/487; 235/494

(58) Field of Classification Search ........ 235/487–488, 235/380, 454, 469, 494; 382/162–167
See application file for complete search history.

(56) References Cited

U.S. PATENT DOCUMENTS

| | | | | |
|---|---|---|---|---|
| 3,835,297 | A * | 9/1974 | Inoue et al. | 235/469 |
| 3,836,754 | A * | 9/1974 | Toye et al. | 235/488 |
| 4,766,026 | A | 8/1988 | Lass et al. | |
| 5,298,922 | A | 3/1994 | Merkle et al. | |
| 5,508,826 | A * | 4/1996 | Lloyd et al. | 358/501 |
| 5,541,396 | A * | 7/1996 | Rentsch | 235/454 |
| 5,568,555 | A * | 10/1996 | Shamir | 380/51 |
| 5,787,186 | A | 7/1998 | Schroeder | |
| 5,958,528 | A | 9/1999 | Bernecker | |
| 6,242,156 | B1 * | 6/2001 | Teng | 430/270.1 |
| 6,286,761 | B1 * | 9/2001 | Wen | 235/468 |
| 6,349,185 | B1 * | 2/2002 | Burkes et al. | 399/49 |
| 6,402,037 | B1 * | 6/2002 | Prasad et al. | 235/487 |
| 6,438,251 | B1 * | 8/2002 | Yamaguchi | 382/100 |
| 6,505,779 | B1 | 1/2003 | Power et al. | |
| 6,543,697 | B1 * | 4/2003 | Imade et al. | 235/494 |
| 6,549,303 | B1 * | 4/2003 | Trask | 358/1.9 |
| 6,628,596 | B2 | 9/2003 | Fukuda | |
| 6,633,321 | B1 * | 10/2003 | Maurer | 347/224 |
| 6,808,118 | B2 * | 10/2004 | Field | 235/494 |
| 6,954,293 | B2 | 10/2005 | Heckenkamp et al. | |
| 7,124,944 | B2 | 10/2006 | Selinfreund et al. | |
| 2002/0134846 | A1 | 9/2002 | Brooks et al. | |
| 2003/0086609 | A1 | 5/2003 | Gangadhar | |

FOREIGN PATENT DOCUMENTS

| | | | |
|---|---|---|---|
| JP | 63185638 A * | 8/1988 | |
| WO | WO01/08405 | 2/2001 | |
| WO | WO02/087250 | 10/2002 | |

* cited by examiner

*Primary Examiner*—Thein M. Le
*Assistant Examiner*—Edwyn Labaze

(57) ABSTRACT

An identification document is provided comprising a printable layer, a computer readable data storage element, and a computer readable calibration element. The computer readable data storage element is formed on the printable layer and comprises a plurality of pixels, wherein each pixel has one of a predetermined plurality of colors. The computer readable calibration element is formed on the printable layer and comprises a plurality of pixels and includes information enabling a determination of the pixel size in the computer readable data storage element and also a determination of at least a portion of the predetermined plurality of colors.

26 Claims, 14 Drawing Sheets

THREE DIMENSIONAL DATA STORAGE

RELATED APPLICATION DATA

This application claims priority to the following U.S. Provisional Applications, each of which is incorporated by reference in its entirety:

"Methods and Devices for Providing Three Dimensional Bar Codes", Ser. No. 60/463,660, inventors Robert Jones and Brian Labrec, filed on Apr. 16, 2003;

"Optically Variable Devices with Encrypted Embedded Data for Authentication of Identification Document," Ser. No. 60/463,659, inventors Robert Jones and Leo Kenen, filed Apr. 16, 2003; and "Uniquely Linking Security Elements in Identification Documents," Ser. No. 60/488,536, inventors Robert Durst, Robert Jones, and Leo Kenen, filed Jul. 17, 2003.

This application is also related to the following U.S. patent Documents, each of which is hereby incorporated by reference in its entirety:

Systems and Methods for Recognition of Individuals Using Multiple Biometric Searches (Application Ser. No. 10/686,005, filed Oct. 14, 2003, Publication No. 2004-0133582), Systems and Methods for Managing and Detecting Fraud in Image Databases Used With Identification Documents (application Ser. No. 60/429,501, filed Nov. 26, 2003—Inventors James V. Howard and Francis Frazier);

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Systems, Compositions, and Methods for Full Color Laser Engraving of ID Documents (Aapplication Ser. No. 10/330,034, filed Dec. 24, 2002, Publication No. 2003-0234292—Inventor Robert Jones);

Laser Engraving Methods and Compositions and Articles Having Laser Engraving Thereon (application Ser. No. 10/803,538, filed Mar. 17, 2002, Publication No. 2005-0003297—Inventor Brian Labrec);

Laser Engraving Methods and Compositions and Articles Having Laser Engraving Thereon (application Ser. No. 60/504352, filed Sep. 19, 2003—Inventors Brian Labrec and Robert Jones);

Increasing Thermal Conductivity of Host Polymer Used with Laser Engraving Methods and Compositions (application Ser. No. 10/677,092, filed Sep. 30, 2003, Publication No. 2004-0198858); and Document Laminate Formed From Different Polyester Materials (application Ser. No. 10/692,463, filed Oct. 22, 2003, Publication No. 2005-0084693, Inventor Brian Labrec);

TECHNICAL FIELD

The present invention generally relates to storage of information on documents such as identification and security documents, and in particular, relates to systems and methods for printing information to a document, such as an identification document, so as to increase the amount of data that can be stored in a given area on an identification document, as well as providing an ability to write and rewrite data to already issued identification documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variable or personalized data (i.e., data specific to a particular card or document, for example an employee number) and fixed or invariant data (i.e., data common to a large number of cards, for example the name of an employer). All of the cards described above will hereinafter be generically referred to as "ID documents".

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16 1993 to J. W. Luening, et al. All of the aforementioned documents are hereby incorporated by reference.

Printing of Information to Identification Documents

As those skilled in the art will appreciate, information can be printed to identification documents in many ways. Identification documents have been printed using technologies such as dye diffusion thermal transfer (D2T2), inkjet printing, thermal transfer, laser xerography, offset printing, intaglio, Indigo, LaserJet printing, etc.

The above-described printing techniques are not the only methods for printing information on data carriers such as ID documents. Laser beams, for example can be used for marking, writing, bar coding, and engraving many different types of materials, including plastics. Lasers have been used, for example, to mark plastic materials to create indicia such as bar codes, date codes, part numbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat which causes a visible discoloration in the thermoplastic. The visible discoloration serves as a "mark" or indicator; it will be appreciated that laser beams can be controlled to form patterns of "marks" that can form images, lines, numbers, letters, patterns, and the like. Depending on the type of laser and the type of material used, various types of marks (e.g., dark marks on light backgrounds, light marks on dark backgrounds, colored marks) can be produced. Some types of materials are capable of absorbing laser energy in their native state to a degree such that usable marks are formed. Some types of thermoplastics, such as polyvinylchloride (PVC), acrylonitrile butadiene styrene (ABS), and polyethylene terephthalate (PET), polycarbonate (PC), and polyethylene, may be capable of absorbing some laser energy in their native states, but can be more optimally laser engraved with the addition of one or more additives to be responsive to laser energy. For example, the following commonly assigned patent applications (which are collectively referred to as "laser additive applications"), which are hereby incorporated by reference, describe additives that can enhance the laser engraving process:

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Systems, Compositions, and Methods for Full Color Laser Engraving of ID Documents (application Ser. No. 10/330,034, filed Dec. 24, 2002, Publication No. 2003-0234292—Inventor Robert Jones);

Laser Engraving Methods and Compositions and Articles Having Laser Engraving Thereon (application Ser. No. 10/803,538, filed Mar. 17, 2002, Publication No. 2005-0003297—Inventor Brian Labrec);

Laser Engraving Methods and Compositions and Articles Having Laser Engraving Thereon (application Ser. No. 60/504352, filed Sep. 19, 2003—Inventors Brian Labrec and Robert Jones); and Increasing Thermal Conductivity of Host Polymer Used with Laser Engraving Methods and Compositions (application Ser. No. 10/677,092, filed Sep. 30, 2003, Publication No. 2004-0198858).

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6,179,338 describe various implementations for using a laser to print information, and these patents are incorporated herein in their entirety.

Storage of Information on Identification Documents

Issuers of identification documents are continually looking for ways to provide more information to the limited space available on ID documents. As those skilled in the art know, the information on ID documents can be provided in numerous ways, including methods such as printing or laser engraving (e.g., humanly readable form) and/or by providing a machine readable media (e.g., in a magnetic stripe, bar code, radio frequency identification device (RFID), optical write only device (e.g., such as provided by LaserCard), semiconductor chip (e.g., a so-called "smart card" chip). Some types of information, such as digitally watermarked images, can provide information in both human and machine readable form, in a digital watermark or other steganographic encoding embedded in an image, etc.).

Although machine readable devices such as RFIDs, chips, and magnetic media can provide significantly more information storage capability, in a given area, than conventional printing, these devices are not optimal in all circumstances. Some of these devices add significant cost to the ID document and/or reduce the durability and ruggedness of the ID document. In addition, these devices still can take up considerable space on the document.

Bar Codes

Bar codes are one type of machine readable feature that are relatively inexpensive and generally do not reduce document durability; hence, such codes are commonly used. Bar codes generally comprise a series of digits (e.g., a serial number) coded in black and white bars. Some types of so-called "ordinary" bar code are "vertically redundant", meaning that the same information is repeated vertically. It is in fact a one-dimensional code. The heights of the bars can be truncated without any lose of information. However, the vertical redundancy allows a symbol with printing defects, such as spots or voids, to still be read. The higher the bar heights, the more probability that at least one path along the bar code will be readable.

A two-dimensional (2D) bar code stores information along the height as well as the length of the symbol. In fact, all human alphabets are two-dimensional codes (think of small letters and capital letters). Because both dimensions in 2D contain information, at least some of the vertical redundancy is gone. To prevent misreads and produce an acceptable read rate, techniques such as use of check words can be implemented to help ensure that a read of a 2D bar code is accurate. As use of scanning devices such as movable beam laser scanners and CCD (charge coupled device) scanners has increased, use of 2D bar codes has become more commonplace, especially in identification documents.

Using one dimensional and two dimensional bar codes to provide information in identification documents is known. Traditional black and white bar codes, for example, are capable of encoding a few dozen digits. Because space on many types of identification documents (e.g., driver's licenses) is scarce, however, it is difficult to use bar codes to convey a lot of information about a card bearer, even when using two dimensional bar codes or so-called high definition 2D bar codes.

At least one version of a three dimensional (3D) bar code has been developed, the so-called "bumpy barcode". Such known types of 3D barcodes comprise a linear barcode (such as a 1D or 2D barcode) embossed on a surface such that the code has a third (height) dimension. Such a 3D barcode can be read by using differences in height, rather than contrast, to distinguish between bars and spaces using a special reader. Examples of usages for 3D barcode are where typical 1D and 2D barcodes cannot be easily placed (such as where printed labels will not adhere) or situations where ID and/or 2D bar codes can be destroyed by a hostile or abrasive environment. Another application of conventional 3D bar codes is situations where the bar code needs to be painted or coated. 3D bar codes can be painted or coated and still be read.

Known 3D barcodes, however, are not capable of being easily re-written to convey new information. Once provided on a device, the 3D bar code is, effectively, "permanent" unless abraded or shaved off. This can be disadvantageous for use in certain types of identification documents, where information (even variable information—such as address, security clearance, citizenship, etc.) can change. In addition, known 3D bar codes are still limited in the amount of information that they can convey. There exists a need for a new type of 3D data storage that can convey large amounts of information in a given area. There also exists a need for a new type of 3D bar data storage that, at least in some instances, can be capable of being rewritten and/or erased to convey new information.

We have discovered new techniques for providing a type of "3D" data storage, which can be used for conveying multiple levels of information in a given area. Our systems and methods can even be applied to provide new types of 3D bar codes.

In one embodiment, we provide an area of a document with increased capacity for digital data storage. The digital data is stored by varying the color saturation of the individual pixels that make up a portion of a given visibly printed indicia, which indicia can, for example, be a line (curved or straight), border, insignia, bar code, or virtually any other element of an ID document. We assign each range of color saturation a numerical weight that can be associated with a unit of data (e.g., a binary numeral, an ASCII code, etc). This enables us to increase the amount of information that a given group of pixels (or even a single pixel) can convey. For example, instead of a black pixel indicating a first value and a clear space indicating a second value, it is possible to vary the color saturation of the pixel—e.g. using varying shades of gray—to increase the information that can be conveyed in a given pixel. Although some types of color variation of pixels has been proposed previously (see, e.g., U.S. Pat. No. 5,369,261 and U.S. Pat. No. 5,818,032, each of which is incorporated herein in its entirety), as described herein, we have invented innovative systems, methods, and data structures that can provide advantages that were not possible previously.

In one advantageous embodiment, we propose forming the pixels using a laser engraving and/or marking technique, preferably using the technique and materials disclosed in commonly assigned U.S. patent application Ser. No. 10/326,886, which is incorporated by reference herein in its entirety. By forming the pixels using such a laser engraving method, it is possible to precisely control the pixel color saturation to a very high accuracy. Moreover, through careful selection of materials (as will be described herein), it is possible to laser mark a given pixel at a first intensity using a first laser, and then later apply a laser again to that pixel to either darken the pixel further (e.g., by using a YAG laser) or to effectively "whiten" the pixel by removing the information in the pixel (e.g., by using a $CO_2$ laser to ablate, etch, or "drill" away the material previously printed by laser). As those skilled in the art will appreciate, laser darkening or "whitening" can even by done to a finished, laminated ID document (assuming that layers overlaying the laser engraved layer are at least partially optically transparent to laser radiation), without necessity of removing any layer of the ID document.

The ability to not only write but also (at least in a limited capacity) to rewrite can be particularly advantageous for identification documents because information on the documents can be updated without having to take apart the document, remove an overlaminate, etc. One skilled in the art will also appreciate that being able to rewrite and/or erase 3D bar coded information can be advantageous in many applications beyond the field of identification documents.

In a second embodiment, we propose encrypting machine readable information such as a digital signature within the 3D barcode.

In one embodiment, we providing an identification document comprising a printable layer, a computer readable data storage element, and a computer readable calibration element. The computer readable data storage element is formed on the printable layer and comprises a plurality of pixels, wherein each pixel has one of a predetermined plurality of colors. The computer readable calibration element is formed on the printable layer and comprises a plurality of pixels and includes information enabling a determination of the pixel size in the computer readable data storage element and also a determination of at least a portion of the predetermined plurality of colors.

In at least one embodiment, the computer readable data storage element and the computer readable calibration element are printed using the same type of printing, such as laser engraving. In one embodiment, at least one of the pixels in the computer readable data storage element is capable of being changed (such as being darkened or cleared) after printing by application of additional laser radiation to the pixel.

In one embodiment, the pixels of the computer readable data storage element are spaced apart from each other by one or more predetermined pixel spacings and where the computer readable data calibration element further comprises information enabling a determination of at least one of the pixel spacings.

In another aspect, we provide a system for providing a printed computer readable data storage element on document, comprising a printable document substrate, a computer readable array of pixels printed on the document substrate and means formed on the printable document substrate for calibrating the intensity of each pixel in the computer readable array of pixels. The system in one embodiment can also include means formed on the printable document substrate for determining the size of each pixel in the computer readable array of pixels. The system in one embodiment can also include means formed on the printable substrate for determining the spacing between the pixels in the computer readable array of pixels.

In still another embodiment, we provide a method for providing a printed computer readable data element to a document, comprising:

printing a first plurality of pixels to a first location on a document, each pixel having a pixel intensity, each pixel intensity associated with a respective piece of data;

printing a second plurality of pixels to second location on the document, the second plurality of pixels comprising at least one pixel associated with each possible pixel intensity;

printing a third plurality of pixels to a third location on the document, the third plurality of pixels comprising a pair of pixels spaced apart and capable of being scanned by a scanner; and.

printing a fourth plurality of pixels to a fourth location on the document, the fourth plurality of pixels spaced a predetermined distance from the second and third pluralities of pixels, the fourth plurality of pixels serving to reference the locations of the second and third pluralities of pixels.

The first plurality of pixels can be interpreted by first scanning at least one of the second, third, and fourth pluralities of pixels. A reference pixel can be printed to a fourth location on the document, the reference pixel spaced a predetermined distance from the fourth plurality of pixels and from the first plurality of pixels, the reference pixel helping to define at least one predetermined pixel intensity. The pixels can be printed by laser engraving.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein.

Figure 1A:
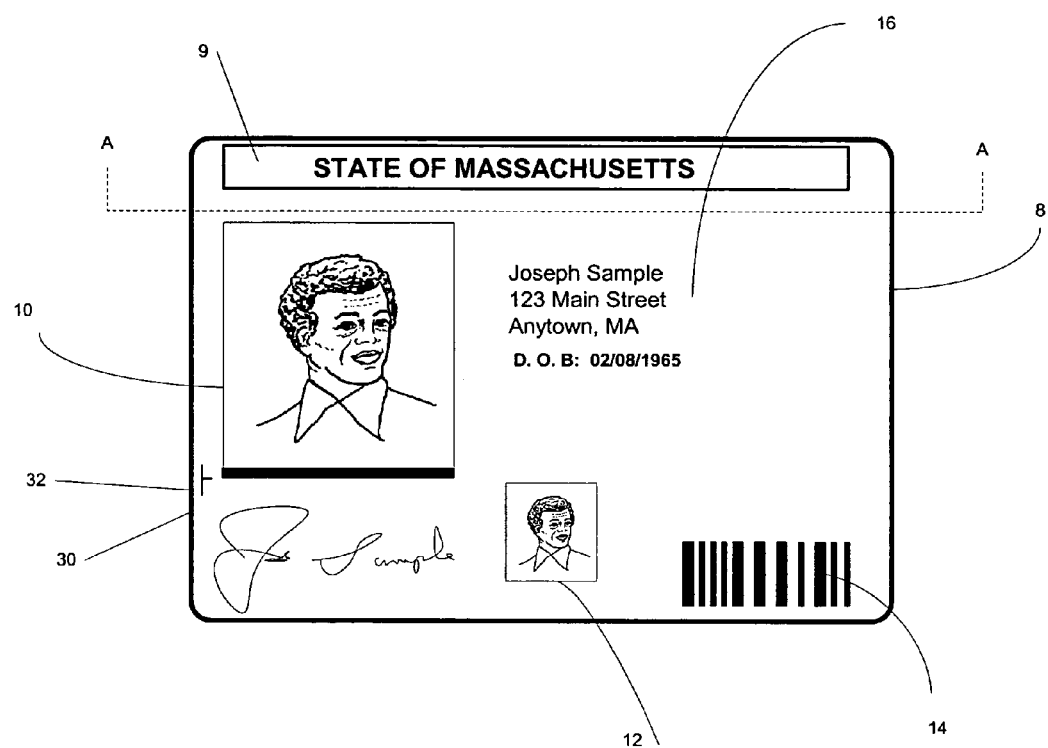
FIG. 1A is an illustration of an identification document in accordance with a first embodiment of the invention.

Of course, the drawings are not necessarily drawn to scale, with emphasis rather being placed upon illustrating the principles of the invention. In the drawings, like reference numbers indicate like elements or steps. In addition, in the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

FIG. 1 is an illustration of an identification document 8 in accordance with a first embodiment of the invention. The identification document 8 can be formed using core material such as PVC, TESLIN (available from PPG industries of Pittsburgh, Pa.), or polycarbonate (PC), and can be laminated with a clear laminate. The identity document 8 can include, for example, fixed data 9, a portrait of the cardholder 10, a ghost image 12, a bar code 14 (which, in many instances, may be located on the rear side (not shown) of the identification document 8), variable data such as a cardholder address and birthdate 16, and a magnetic stripe (not shown in FIGS. 1 or 2 but often found on the rear side of an identification card). The identification document 8 also includes a data storage element 30 and associated calibration mark 32, which are shown for illustrative purposes only as bar and a cross, respectively (the calibration mark 32 and data storage element 30 can have virtually any shape). These elements are described more fully herein.

In the embodiment of FIG. 1, the data storage element 30 and calibration mark 32 can be formed using laser engraving or marking, but those skilled in the art will appreciate that conventional printing techniques, including but not limited to thermal transfer and D2T2, can be used to print the calibration mark 32 and data storage element 30 in accordance with at least some embodiments of the invention. Laser engraving or marking may be preferred because of the ability of the laser to control pixel size and density.

Although the data storage element 30 and calibration mark 32 are shown as being a substantially visible element of the identification document 8, those skilled in the art will appreciate that, if desired, the data storage element can also be "hidden" or "camouflaged" as part of one or more images or elements on the card, so long as the data storage element is capable of being detected and read by an appropriate scanner (e.g., a charge coupled device (CCD) scanner). By "hidden", it is not required that the location or existence of the data storage element 30 and/or calibration mark 32 be completely hidden from being viewed by an unaided human eye, although it is within the spirit and scope of the invention to hide the location and/or existence of either or both of the data storage element 30 and calibration mark. "Hiding" or "camouflaging" the data storage element 30 and/or calibration mark can, for example, be accomplished by making the data storage element appear to be an existing line on a document, such as the border line under the portrait 10 of FIG. 1. Those skilled in the art will recognize, of course, that many different ways of providing the data storage element 30 and calibration mark 32 on the document. For example, commonly assigned patent application Ser. No. 09/090,067, entitled, "IDENTIFICATION DOCUMENT WITH DOCUMENT SPECIFIC REDUCED SCALE PRINTING," filed Jun. 3, 1998, describes systems, methods, and articles of manufacture having reduced scale printing that can be substantially hidden on the identification document.

Figure 1B:
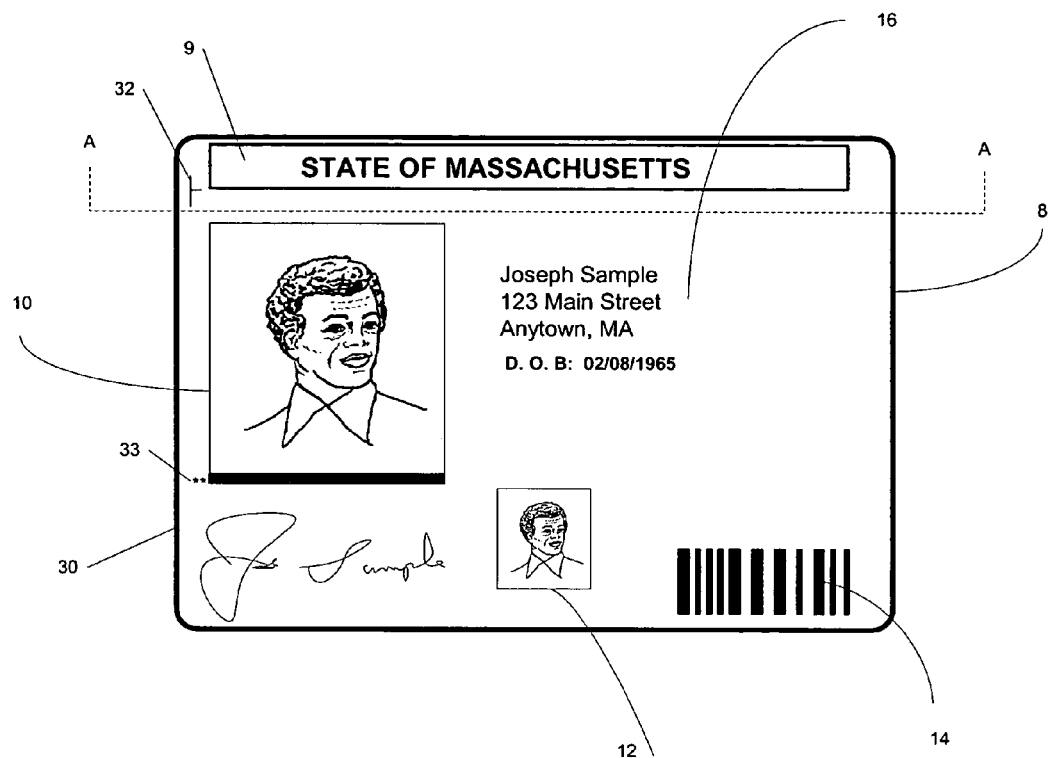
FIG. 1B is an illustration of an identification document in accordance with a second embodiment of the invention.
Figure 2:
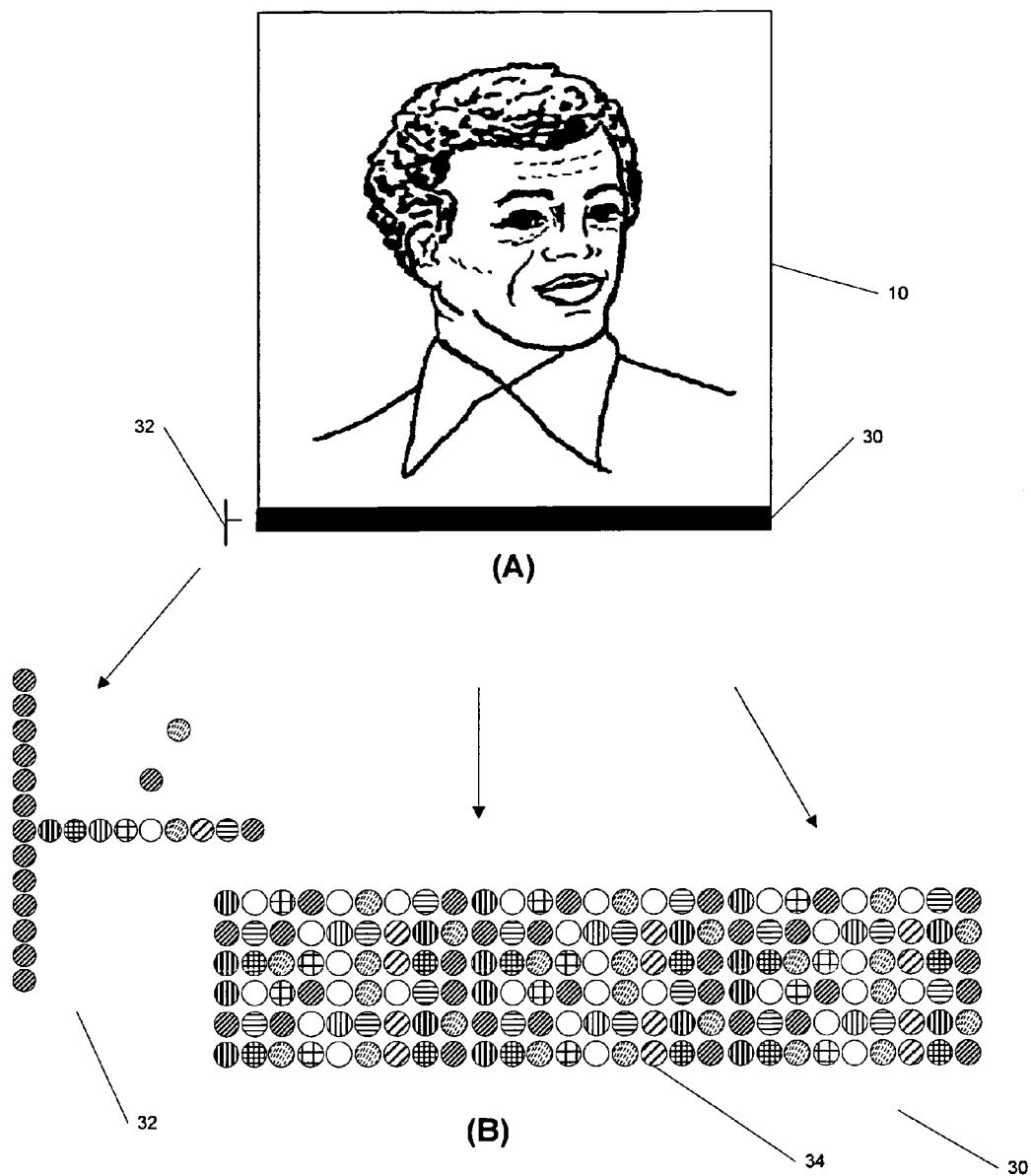
FIGS. 2A and 2B are first and second enlarged views of the bearer image, data storage element, and calibration mark of the identification card of FIG. 1.

FIGS. 2A and 2B are first and second enlarged views of the bearer image 10, data storage element 30, and calibration mark 32 of the identification card of FIG. 1. FIG. 2A shows how, in this embodiment, the calibration mark 32 is positioned relatively close to the data storage element 30. Positioning the calibration mark 32 substantially near the data storage element 30 can assist a scanner in being able to locate the data storage element 30 and read the information therein. However, it is not required for the invention that the calibration mark 32 be substantially near the data storage element 30, as shown in FIG. 2. For example, as shown in FIG. 1B, the calibration mark 32 could be located in a predetermined area of the identification document 8 (e.g., a corner), and another data identifying mark 33 can be located in a predetermined position in relation to the data storage element 30. The identifying mark 33 preferably is located at a side of the data storage element 30 such that a scanner will know where to "start" scanning the data storage element 30.

FIG. 2B is an enlarged view of the data storage element 30 and calibration mark 32, showing that each comprises a plurality of pixels 34 having variations in pixel saturation. The illustrations of pixel size, orientation, and shading for the data storage element 30 and calibration mark 32 are merely illustrative and not intended to depict the actual physical appearance of the pixels as printed on the identification document 8. In accordance with at least some embodiments of the invention, we have found that the information conveyed by the data storage element 30 can be conveyed not only in positioning and spacing of the pixels (X and Y directions), but also in the saturation of the pixels (Z direction), providing what we refer to as "3D Data Storage". Depending on the size of the data storage element 30, the range of pixel saturation, and the printing resolution, this can provide a surprising amount of data storage potential. We have found, for example, using laser engraving, it is possible to achieve resolutions of at least 500 to 2000 pixels per square inch.

In an example embodiment of our invention, assume that the pixels are printed at 500 dots per inch (dpi) and that the data storage element has dimensions of 1 inch by 1/10 inch. This can provide up to 50 rows of 500 pixels each. Assume further that we print only to every other one of these 50 rows. 25 rows times 500 pixels per line provides 12,500 pixels that can be printed. If, for example, each pixel can have one of four possible intensity levels, there can be at least 50,000 unique possibilities for data storage, assuming that a scanner or other device can resolve the individual pixel. Pixel resolution can be improved through providing more space around the pixels, such as by printing only to every other row (as described above). Alternately, for situations where individual pixels can be difficult to resolve, pixels can be grouped into clusters of "super pixels," as those skilled in the art will appreciate. The size of the pixels also can be made larger. 50,000 pixels can be enough to store significant amounts of personalized data, such as a full face template for use by a biometric search engine, a few fingerprint templates, demographic data, etc.

It should be understood that although the "pixel" in the above examples shown herein is shown to have a substantially circular size and shape, that is not limiting. The pixel can have virtually any size and shape so long as it is differentiable from others of its kind in at least two directions.

Figure 3:
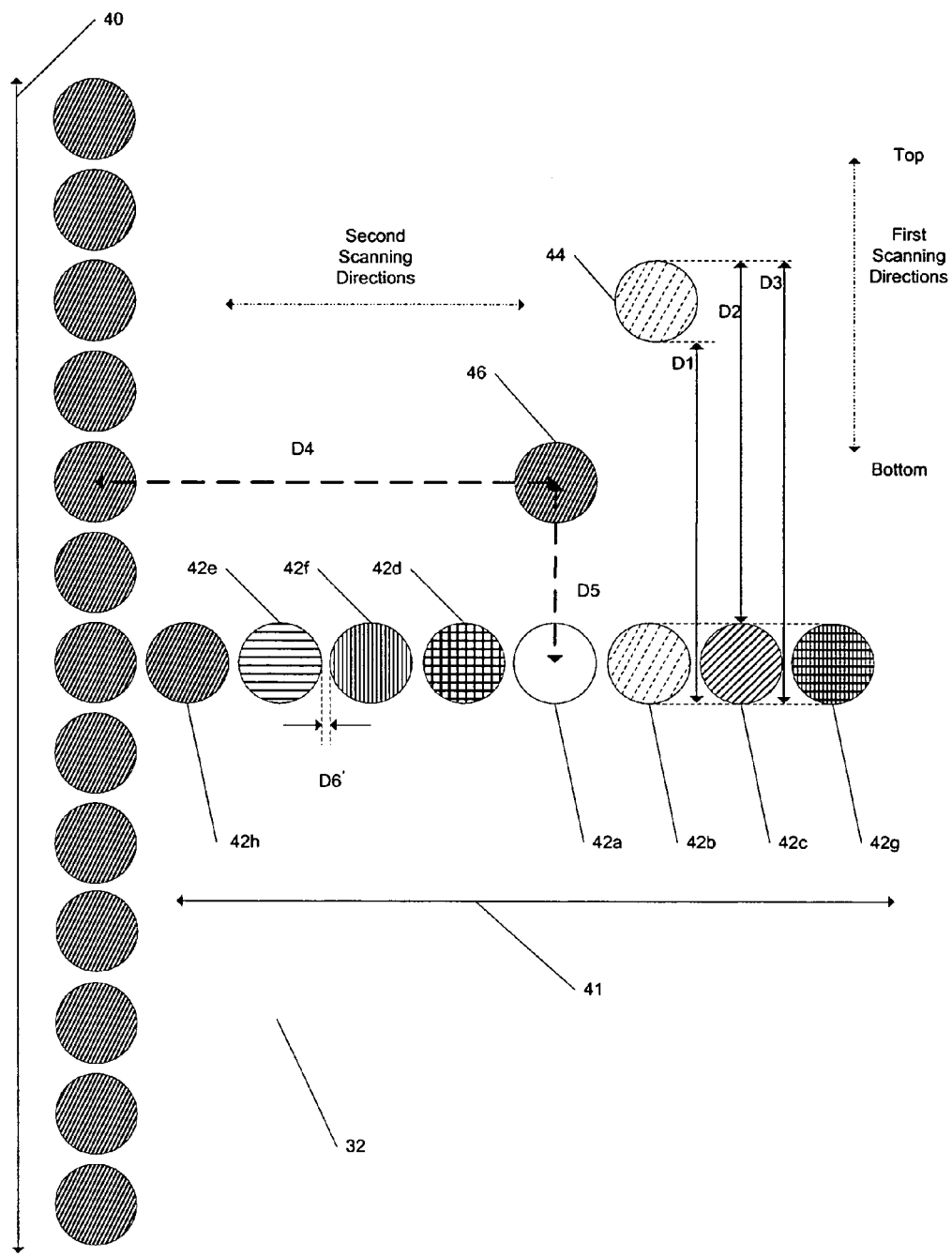
FIG. 3 is an enlarged, detailed view of the calibration mark of the identification card of FIG. 1.

FIG. 3 is an enlarged, detailed view of the calibration mark 32 of the identification card of FIG. 1. In this embodiment, to optimize the scanner's accuracy in locating and reading the data storage element 30, the calibration mark 32 is printed using the same printing mechanism and/or device that is used to print the data storage element 30. Using the same printer (or same laser engraving device) helps ensure that the pixel size, spacing, and intensity in the calibration mark 32 is substantially the same as that of the data storage element 30. This can help ensure that the calibration mark 32 can tell the scanner with accuracy what to look for in the data storage element 30.

Referring to FIG. 3, the calibration mark 32 includes an orientation portion 40 consisting of an array of pixels of a predetermined intensity. The purpose of the orientation portion 40 is to serve as a recognizable indicator to the scanner to identify the calibration mark 32 as a calibration mark. Generally, the orientation portion 40 will consist of a plurality of pixels having a color, size, and or shape that is not found elsewhere on the identification document (similar to registration marks found on other types of printed documents and articles of manufacture). In the illustrative example of FIG. 3, the orientation portion 40 consists of an array of 13 pixels, each having an intensity corresponding to the "darkest" pixel intensity.

Figure 4:
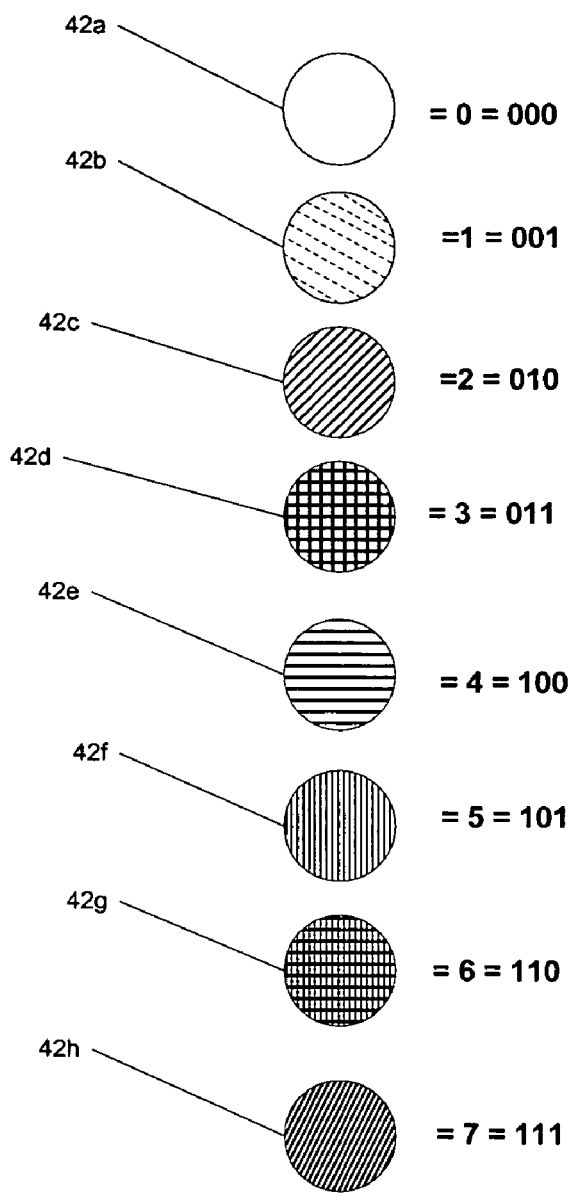
FIG. 4 is a diagram illustrating binary values associated with a respective set of pixel intensities, in accordance with a first embodiment of the invention.

The calibration mark 32 also includes an intensity scale portion 41 that includes pixels 42a–42i showing all possible pixel intensity levels that can appear in the data storage element 30. Again, it should be appreciated that the representations of pixel intensities in the intensity scale portion 41 are merely illustrative and not intended to show literally how each pixel would appear. Referring briefly to FIG. 4, each individual pixel can be associated with a predetermined value or indication, such as (in the example of FIG. 4) a binary digit. Of course, the illustration of binary digits is not limiting, and many different types of predetermined data can be associated with each intensity level (e.g., selected ASCII characters, codes, etc.). In addition, although the example of FIGS. 1–4 show eight different intensity levels for a pixel, those skilled in the art will recognize that fewer or more intensity levels are also possible. Further, although FIG. 4 shows that the lightest pixel level is a substantially "colorless" pixel, the invention is not so limited. The lightest pixel could have an intensity level that is printed and is not colorless. In addition, the "darkest" pixel level can also be darker than the level shown in FIG. 4.

The data storage element 30 is printed in accordance with the information of FIG. 4 to convey the necessary data. We have found that, for at least some embodiments, using laser engraving, instead of conventional printing, permits more precision in printing pixels at desired resolution. Using laser engraving also permits at least some of the information in the data storage element 30 to be modified at a later time without disassembly of the identification document 9. However, conventional printing is still intended to be fully within the scope of the invention. Further, in at least some embodiments, it can be possible to modify printed information at a later time, although in at least some of those instances it may require disassembly of at least part of the identification document.

Referring again to FIG. 3, the calibration mark 32 provides a way for a scanner to determine pixel size. Note that all of the following calculations and determinations assume, of course, that a scanner has sufficient resolution to detect and resolve the pixels. The calibration mark 32 includes a sizing pixel 44 that is printed so as to be in substantial alignment with at least one other pixel (in this example, pixel 42b). When the scanning pixel 44 is scanned in accordance with the "fist scanning direction" of FIG. 3, from the "top" of FIG. 3 towards the "bottom" (and then back from bottom to top) of FIG. 3, towards pixel 42b, the scanner can detect transitions from areas of no printing to areas where a pixel is printed. Thus, the scanner can compute D1 (distance from bottom of pixel 42b to bottom of sizing pixel 44), D2 (distance from top of sizing pixel 44 to top of pixel 42b), and thus can determine D3 (distance from top of sizing pixel 44 to bottom of pixel 42b). Thus, the size of a pixel can be computed by subtracting either D1 or D2 from D3.

Another feature that the calibration mark 32 can provide is a determination of pixel spacing. By knowing the pixel size (as computed above) and knowing how many predetermined pixels are printed in at least on portion of the calibration mark 32 (e.g., in the intensity scale portion 41), it is possible, using the scanner, to compute the distance between pixels (D6). For example, by using the size of the pixel to count over three pixels from the orientation portion 40, then counting over two pixels from the orientation portion 40, the distance D6 can be determined.

Note, also, that although the distance D6 between pixels is shown (for simplicity) in the examples herein as being a fixed distance, the D6 distance can, of course be varied, where specific variations can provide further data storage indications (in a manner similar to distances between bars in a barcode). This can be accommodated in the calibration mark 32 by showing predetermined varied, measurable distances between pixels in the intensity scale portion 41 and/or the orientation portion 40.

Another important feature that the calibration mark 32 provides is determination of what a "colorless" pixel looks like. Generally, a colorless pixel will correspond to an area of the identification document 8 that has no printing, and the "colorless" pixel has an intensity that corresponds to whatever background color the identification document has (we refer to this case a "card noise" color). As will be appreciated, it can be difficult to show what colorless pixels look like or to predefine it in advance, because colors of identification documents can vary, even from card to card. One way that we have developed is to designate a predetermined area of the calibration mark 32 as being an area for locating colorless pixel 42a and measuring and defining what the colorless pixel 42a looks like.

Referring to FIG. 3, we can predefine a location for where a so-called substantially "colorless" pixel is to appear and measure what the intensity of that pixel is. Note that "colorless" does not imply or require that the pixel be completely translucent or without any color at all. Rather, colorless encompasses areas corresponding to pixels where there is little to no printing and the normal background color(s), whatever they may be, show through. In the examples shown herein, for simplicity, a light colored, non-patterned background is assumed.

The actual color of such substantially "colorless" pixels may actually correspond to whatever the background color is for the area in which the calibration mark 32 is printed. Because we are assuming that the substantially colorless pixel of the calibration mark 32 will have approximately the same intensity as a substantially colorless area in the data storage element 30, the calibration mark 32 and the data storage element 30 be located on areas of the identification document that have fairly similar background coloration. Many identification documents can have rather elaborate background art—fine line printing, guilloche, images, and other artwork, having many different colors, but generally the design and location of such background information is known in advance of the printing of the calibration mark 32 and the data storage element 30. Thus, locations can be selected for the calibration mark 32 and the data storage element 30 that will be known to have similar background colors.

Referring again to FIGS. 3 and 4 and the method for predefining the location in the calibration mark 32 for the "colorless" pixel, we can print, at a predetermined distance D4 from the orientation portion 40 a card noise pixel 46. We can then define that the intensity of a "colorless" pixel will correspond to whatever color level on the intensity portion 41 is D5 away from that pixel. By scanning from left to right or right to left (the second scanning direction of FIG. 3), the scanner can locate the card noise pixel 46. Then, based on the previously determined pixel sizes, spacings, and intensities, we can effectively locate where the "colorless" pixel 42a is and set this level for future reference.

Note that the particular design and shape of the calibration mark 32 shown in FIG. 3 is merely illustrative and not intended to be limiting. For example, the locations of the orientation portion 40 and intensity scale portion 41 can be swapped, changed, or even spaced further apart, so long as their relation to each other is determinable and understood. The shapes and sizes of the orientation portion 40 and intensity scale portion 41 can vary, as well, and need not be linear arrays of pixels, as shown in FIG. 3. For example, the orientation portion 40 could have a circular, semi-circular, square, or rectangular shape, e.g., to "frame" the intensity scale portion 41, or vice versa. Many different configurations and designs of calibration mark 32 will occur to those skilled in the art and are intended to be within the scope of the invention.

Based on the information learned from scanning the calibration mark 32, and knowing the predetermined data associated with each intensity level (FIG. 4), it is now possible to scan the data storage element 30 and read the data. Further, as will be described herein, we can use the information gleaned from the calibration mark 32 to rewrite one or more pixels.

Figure 5:
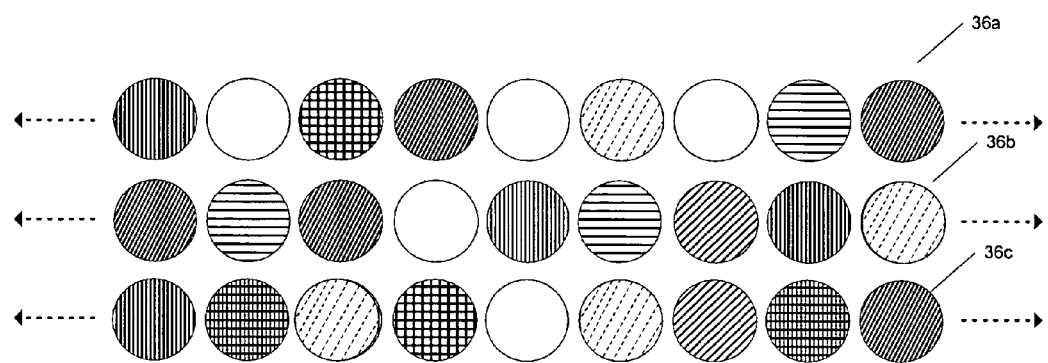
FIG. 5 is an enlarged, detailed view of a portion of the data storage element of FIG. 1.
Figure 10:
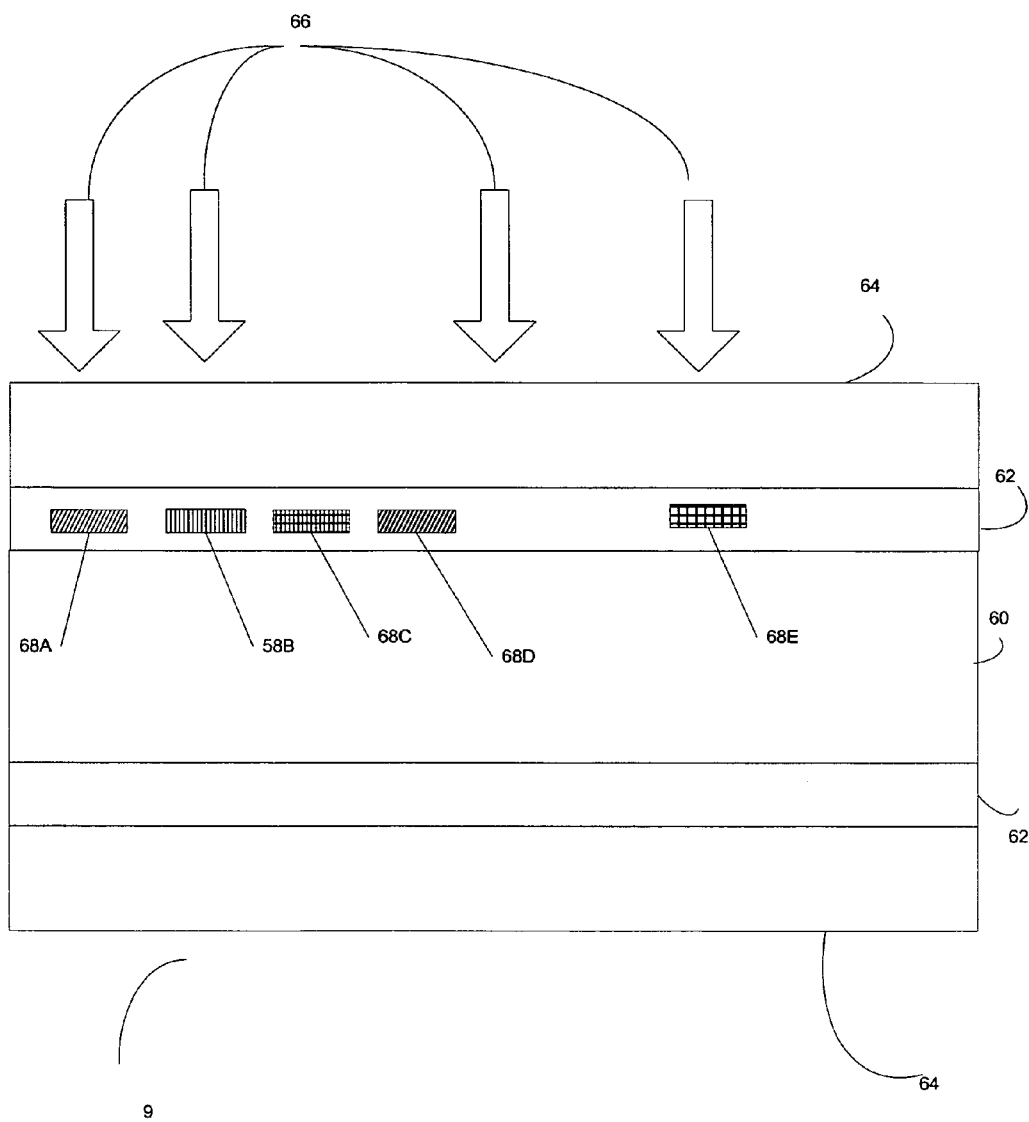
FIG. 10 is a cross sectional illustrative view of the identification document of FIG. 1 taken along the A—A line, showing laser engraving of the ID document.

FIG. 5 is an enlarged, detailed view of a portion of the data storage element of FIG. 1, illustrating how pixels can be aligned and can vary in intensity. In this example, there are three pixel rows 36a, 36b, and 36c in the data storage element 30. In this example, also, laser engraving is used to print the pixels 34 to the identification document 9. FIG. 10 is a cross sectional illustrative view of the identification document of FIG. 1 taken along the A—A line, showing laser engraving of the ID document. Referring to FIG. 10, the identification document 9 includes a core layer 60, two laminate layers 62, and two overlaminate layers 64. In this example, the laminate layers 62 each include laser sensitizing additives as described in the aforementioned laser additive applications. As laser radiation 66 is directed towards selected areas of the identification document, laser pixels 68a–68e, at varying intensities, can be formed.

Figure 6:
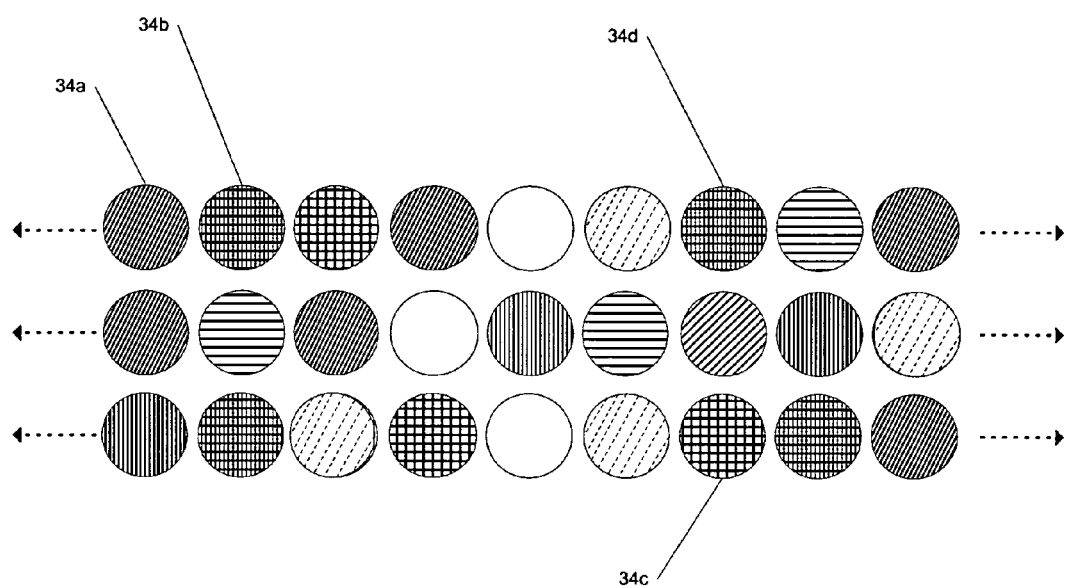
FIG. 6 is an enlarged, detailed view of a the data storage element of FIG. 1, after a laser has been used to selectively darken a portion of the pixels.
Figure 11:
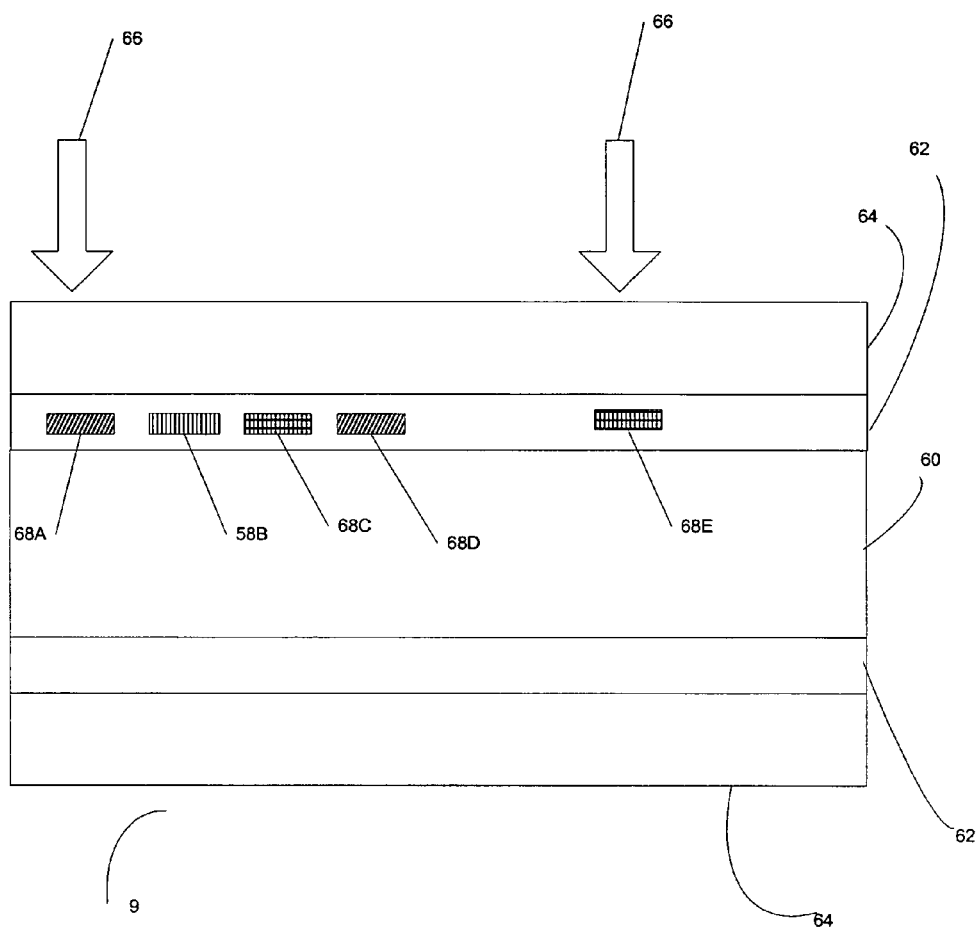
FIG. 11 illustrates the identification document of FIG. 10 as certain pixels are "darkened" by laser radiation.

FIG. 6 is an enlarged, detailed view of the data storage element of FIG. 1, after a laser has been used to selectively darken a portion of the pixels. As FIG. 6 illustrates, pixels 34a, 34b, 34c, and 34d have each been darkened to a darker intensity level (see FIG. 4) than these respective pixels appeared to have in FIG. 5. Referring to FIG. 11, FIG. 11 illustrates the identification document of FIG. 10 as certain pixels are "darkened" by laser radiation 66. As FIG. 11 shows, laser pixels 68a and 68e are darkened by the laser radiation 66.

Figure 7:
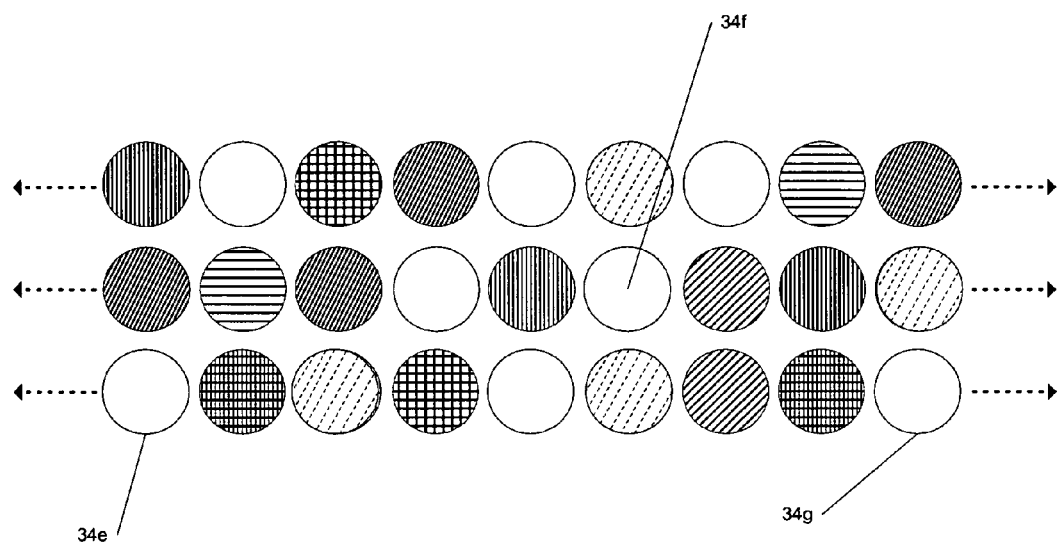
FIG. 7 is an enlarged, detailed view of a the data storage element of FIG. 1, after a laser has been used to selectively "whiten" a portion of the pixels.
Figure 12:
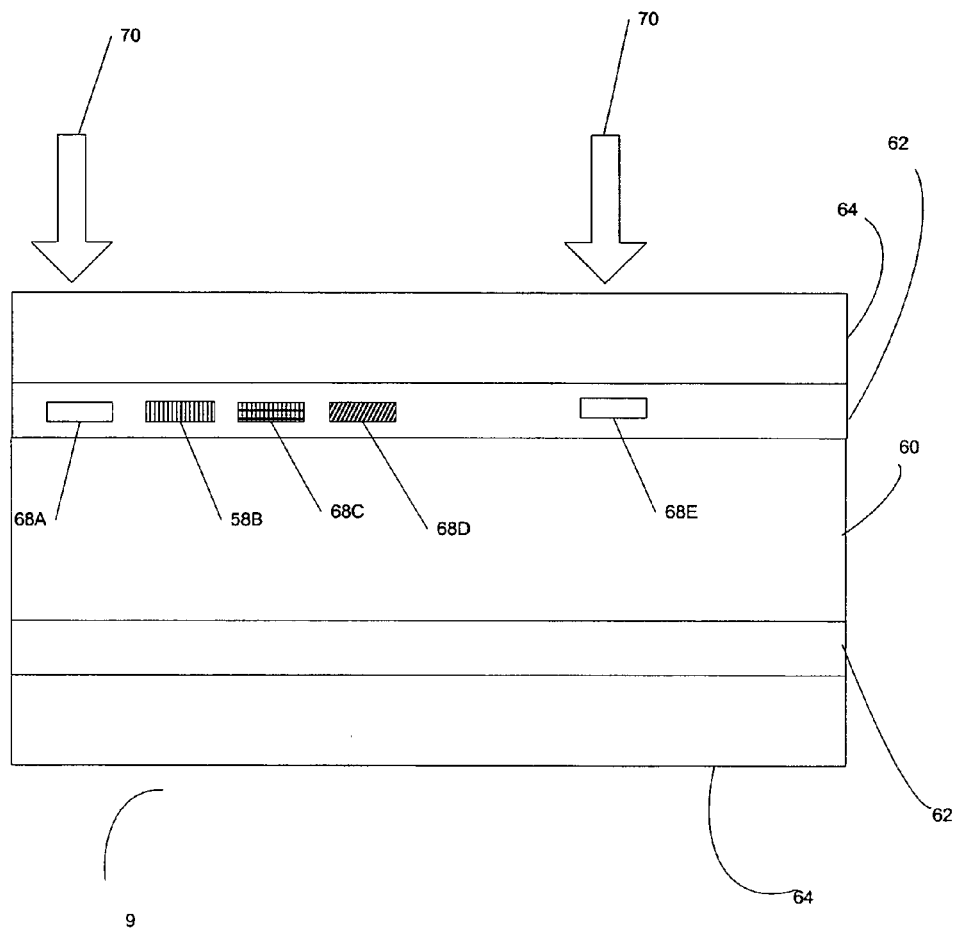
FIG. 12 illustrates the identification document of FIG. 10 as certain pixels are "erased" by laser radiation.

FIG. 7 is an enlarged, detailed view of the data storage element of FIG. 1, after a laser has been used to selectively "whiten" a portion of the pixels. By "whitening", we mean removing the color from the pixel so that the pixel is substantially colorless. In FIG. 7, pixels 34e, 34f, and 34g had the color removed. With laser engraved pixels, the color of the pixel can be removed by using an appropriate laser (e.g., a CO2 laser) to abrade away, etch, or otherwise "cut out" the previously colored area from the pixel location. FIG. 12 illustrates the a portion of data storage element 30 of the identification document 9 of FIG. 10 as certain pixels are "erased" by erasing laser radiation 70.

Figure 8:
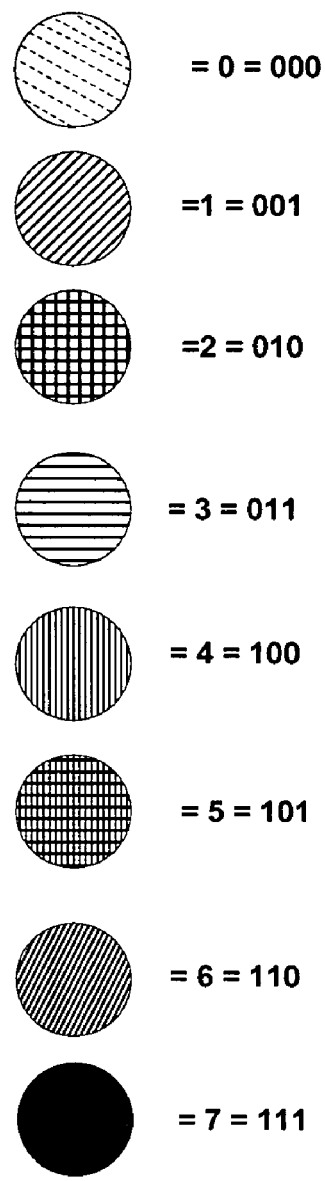
FIG. 8 is a diagram showing the resultant set of pixel intensities after possible after a laser is used to darken the pixels of the diagram of FIG. 4.

In another aspect of the invention, laser darkening of the pixels can be used to completely re-define all pixel intensities. For example, the "darkest" pixel intensity can be made darker and the lightest "colorless" pixel can be given a new, darker level. This is illustrated in FIG. 8, which is a diagram showing the resultant set of pixel intensities after possible after a laser is used to darken the pixels of the diagram of FIG. 4.

Figure 9:
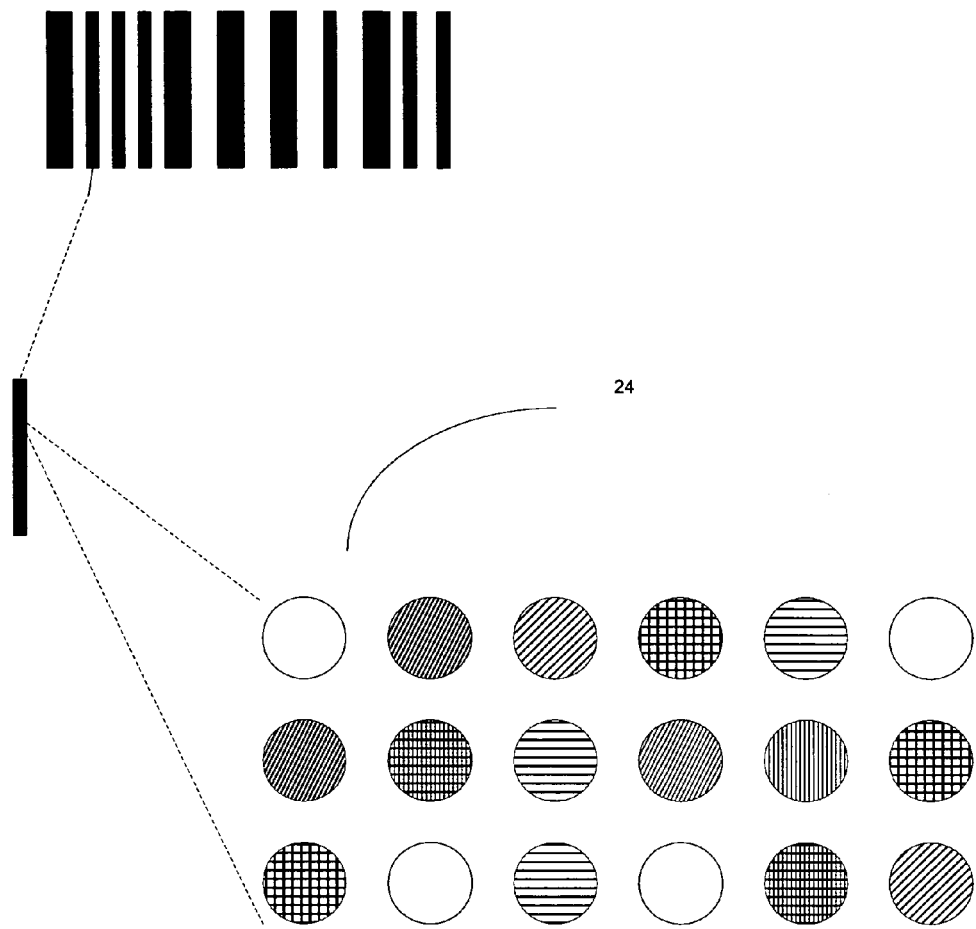
FIG. 9 is an illustrative example an enlarged view of a 3D bar code in accordance with an embodiment of the invention, showing the variations in pixel saturation of a portion of a line in the bar code.

As we described previously, our calibration mark and data storage element can be adapted to work with other existing printed elements on the card, such as 1D, and 2D barcodes, to make such bar codes carry an additional third dimension of information. FIG. 9 is an illustrative example an enlarged view of a portion 24 of a 3D bar code in accordance with an embodiment of the invention, showing the variations in pixel saturation of a portion of a line in the bar code.

Figure 13:
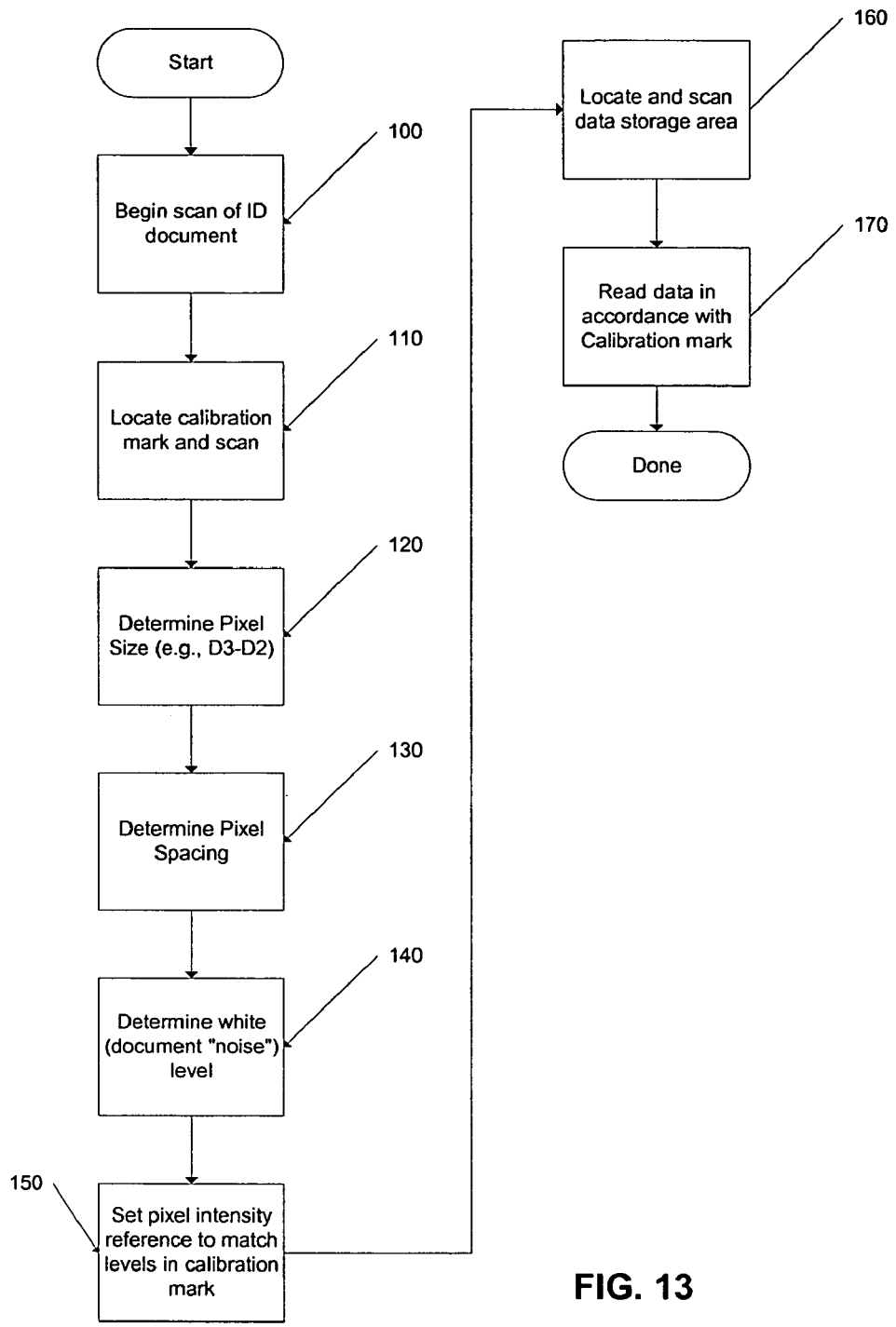
FIG. 13 is a flow chart of a process for calibrating and reading of data on the identification document of FIG. 1.

FIG. 13 is a flow chart of a process for calibrating and reading of data on the identification document of FIG. 1. This process can be implemented using one or more scanners capable of reading the calibration mark 32 and the data storage element 30, together with a general purpose computer or other method for computing the distances, storing the predetermined data lookup tables, etc. Referring to FIG. 13, the scanner scans the ID document (step 100) to first locate the calibration mark (step 110). Note that in at least some embodiments, the scanner and/or computer may have knowledge of a predetermined location of a calibration mark and may not need to scan the card to locate the mark. When the mark is located, the pixel size, pixel spacing, and "colorless" levels (if applicable for the latter) are determined, and the actual pixel intensities (corresponding to predetermined values) are measured (steps 120, 130, 140, 150), such as by the methods described herein. Note also that the order of steps 120, 130,140, and 150 are not limiting, and these steps can be accomplished in any order.

After the calibration mark 32 is read (steps 100–150), the information learned is used to locate and scan the data storage element 160 and to read the data therein 170.

As those skilled in the art will appreciate, other elements can be added to the data storage element 30 to improve the accuracy of data storage and reading. For example, the data storage element can include error correction and/or checksum bits (the reader is presumed to be familiar with such technologies and they are not explained further here). The data storage element 30 can contain a digital signature or encrypted embedded data, as described in commonly assigned patent applications: "Optically Variable Devices with Encrypted Embedded Data for Authentication of Identification Document," Ser. No. 60/463,659, inventors Robert Jones and Leo Kenen, filed Apr. 16, 2003, and an application of the same title converting that provisional application, filed Mar. 31, 2004, (Application No. 10/816,175, filed Mar. 31, 2004, Publication No. 2005-0010776. Each of these patent applications is incorporated by reference herein.

We also expressly contemplate that the data storage element 30 of the instant invention can contain information linking it to one or more other elements of the identification document, as described in a commonly assigned patent application entitled "Uniquely Linking Security Elements in Identification Documents," Ser. No. 60/488,536, inventors Robert Durst, Robert Jones, and Leo Kenen, filed Jul. 17, 2003.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., product tags, product packaging, business cards, bags, charts, maps, labels, etc., etc., particularly those items including providing a non-visible indicia, such as an image information on an overlaminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use laser engraving or marking by way of example, the present invention is not so limited. Our inventive techniques are useful for data storage elements formed using various printing processes including, but not limited to, dye infusion, mass-transfer, laser xerography, ink jet, wax transfer, variable dot transfer, and other printing methods by which a machine readable image can be formed.

It should be appreciated that the methods for printing, scanning, and reading the calibration mark 30 and the data storage element 30 can be carried out on a general-purpose computer. These methods can, of course, be implemented using software, hardware, or a combination of hardware and software. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc., as needed An edge-detection algorithm may also be incorporated with, or used in concert with, such software. Computer executable software to accomplish these functions can be stored on a computer readable media, such as a diskette, removable media, DVD, CD, hard drive, electronic memory circuit, etc.).

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

We claim:

1. An identification document, comprising:
   a printable layer;
   a computer readable data storage element formed on the printable layer, the computer readable data storage element comprising a plurality of pixels, wherein each pixel has one of a predetermined plurality of colors;
   a computer readable calibration element formed on the printable layer, the calibration element comprising a plurality of pixels and the calibration element including information enabling a determination of at least a portion of the predetermined plurality of colors; wherein the computer readable data storage element includes a plurality of pixels that have been selectively darkened or whitened relative to the calibration element by laser radiation to encode machine readable data in the computer readable storage element.

2. The identification document of claim 1, wherein the computer readable data storage element and the computer readable calibration element are printed using the same type of printing.

3. The identification document of claim, wherein the printing is laser engraving.

4. The identification document of claim 3, wherein at least one of the pixels in the computer readable data storage element is capable of being changed alter printing by application of additional laser radiation to die pixel.

5. The identification document of claim 4, wherein the change is at least one of darkening the pixel and clearing the pixel.

6. The identification document of claim 1, wherein the pixels of the computer readable data storage element are spaced apart from each other by one or more predetermined pixel spacings and where the computer readable data calibration element further comprises infomiation enabling a determination of at least one of the pixel spacings.

7. The identification document of claim, wherein at least one of the computer readable data storage element and the computer readable calibration element is positioned at a predetermined location on the printable layer.

8. The identification document of claim 1, wherein the computer readable calibration element is disposed near the computer readable data storage element.

9. The identification document of claim 1, wherein the identification document further comprises personalized data printed to the printable layer and wherein the computer readable data storage element comprises data, associated with at least a portion of the personalized data.

10. The identification document of claim 1, wherein the computer readable data storage element comprises encrypted data.

11. The system of claim 10, further comprising means formed on the printable document substrate for determining the size of each pixel in the computer readable array of pixels.

12. The system of claim 10, further comprising means formed on the printable substrate for determining the spacing between the pixels in the computer readable array of pixels.

13. The identification document of claim 1 including a laser sensitizing additive layer for receiving the laser radiation.

14. The identification document of claim 13 wherein the laser sensitizing additive layer comprises a laminate layer.

15. A system for providing a primed computer readable data storage element on document, comprising:
   a printable document substrate;
   a computer readable array of pixels printed on the document substrate; and
   means formed on the printable document substrate for calibrating the intensity of each pixel in the computer readable array of pixels: wherein the computer readable array includes a plurality of pixels that have been selectively darkened or whitened relative to the means for calibrating the intensity by laser radiation to encode machine readable data in the computer readable array.

16. The system of claim 15 wherein the printable document substrate includes a laser sensitizing additive layer for receiving the laser radiation.

17. The system of claim 16 wherein the laser sensitizing additive layer comprises a laminate layer.

18. A method for providing a printed computer readable data element to a document, comprising:
- printing a first plurality of pixels to a first location on a document, each pixel having a pixel intensity, each pixel intensity associated with a respective piece of data;
- printing a second plurality of pixels to second location on the document, the second plurality of pixels comprising at least one pixel associated with each possible pixel intensity;
- printing a third plurality of pixels to a third location on the document, the third plurality of pixels comprising a pair of pixels spaced apart and capable of being scanned by a scanner; and;
- printing a fourth plurality of pixels to a fourth location on the document, the fourth plurality of pixels spaced a predetermined distance from the second and third pluralities of pixels, the fourth plurality of pixels serving to reference the locations of the second and third pluralities of pixels; wherein the first plurality of pixels includes a plurality of pixels that have been selectively darkened or whitened by laser radiation to correspond to pixel intensities of the second plurality of pixels and thereby encode machine readable data associated with the possible pixel intensities of the second plurality of pixels.

19. The method of claim 18, wherein the first plurality of pixels can be interpreted by first scanning at least one of the second, third, and fourth pluralities of pixels.

20. The method of claim 18, further comprising printing a reference pixel to a fourth location on the document, the reference pixel spaced a predetermined distance from the fourth plurality of pixels and from the first plurality of pixels, the reference pixel helping to define at least one predetermined pixel intensity.

21. The method of claim 18, wherein the pixels in each plurality are printed by laser engraving.

22. The method of claim 21, wherein at least one of the pixels in the first plurality can be changed by applying additional laser radiation to the pixel.

23. The method of claim 22, wherein the additional laser radiation darkens the pixel.

24. The method of claim 22, wherein the additional laser radiation clean the pixel.

25. The method of claim 18 including applying a laser sensitizing additive layer for receiving the laser radiation.

26. The method of claim 25 wherein the laser sensitizing additive layer comprises a laminate layer.

* * * * *

UNITED STATES PATENT AND TRADEMARK OFFICE
CERTIFICATE OF CORRECTION

PATENT NO. : 7,225,991 B2 Page 1 of 1
APPLICATION NO. : 10/825852
DATED : June 5, 2007
INVENTOR(S) : Robert L. Jones and Leo M. Kenen It is certified that error appears in the above-identified patent and that said Letters Patent is hereby corrected as shown below:

Claim 3, Column 16, line 8, after the word "claim" insert --1--.
Claim 7, Column 16, line 23, after the word "claim" insert --1--.

Signed and Sealed this

Twenty-sixth Day of May, 2009

JOHN DOLL
*Acting Director of the United States Patent and Trademark Office*